United States Patent [19]

Tanimoto et al.

[11] Patent Number: 5,062,035
[45] Date of Patent: Oct. 29, 1991

[54] TIME SLOT ALLOCATION FOR LOOP NETWORKS

[75] Inventors: Shigeaki Tanimoto, Yokosuka; Tadashi Kayano; Hirobumi Karasawa, both of Yokohama; Osamu Yamagishi; Tomoo Kunikyo, both of Tokyo, all of Japan

[73] Assignees: Kabushiki Kaisha Toshiba, Kanagawa; Nippon Telegram and Telephone Corporation, Tokyo, both of Japan

[21] Appl. No.: 64,652

[22] Filed: Jun. 22, 1987

[30] Foreign Application Priority Data

Jun. 24, 1986 [JP] Japan ................... 61-147963

[51] Int. Cl.$^5$ ............... G06F 13/372; G06F 13/14
[52] U.S. Cl. ............... 364/200; 364/221.5; 364/222.2; 364/230.1; 364/231.4; 364/231.7; 364/230; 364/229.3; 364/229; 364/251.4; 364/251; 364/270.4; 364/271.4; 364/284; 364/284.4; 364/919; 364/926.9; 364/926.93; 364/931.43; 364/934.4; 364/935.44; 364/942.1; 364/937; 364/950.5
[58] Field of Search ... 364/200 MS File, 900 MS File; 370/89, 85, 86, 95, 85.7

[56] References Cited

U.S. PATENT DOCUMENTS

| | | |
|---|---|---|
| 3,632,881 | 1/1972 | Graham .................. 179/15 AL |
| 3,732,543 | 5/1973 | Rocher .................. 370/85.14 |
| 3,787,631 | 1/1974 | Lewis .................. 370/67 |
| 3,851,104 | 11/1974 | Willard et al. .................. 370/85 |
| 3,921,137 | 11/1975 | McClearn, Jr. .................. 340/147 R |
| 4,007,441 | 2/1977 | Faber .................. 340/147 R |
| 4,161,786 | 7/1979 | Hopkins et al. .................. 364/900 |
| 4,251,880 | 2/1981 | Baugh et al. .................. 370/80 |
| 4,354,229 | 10/1982 | Davis et al. .................. 364/200 |
| 4,383,315 | 5/1983 | Torng .................. 370/89 |
| 4,387,458 | 6/1983 | Carbrey .................. 370/85.12 |
| 4,389,721 | 6/1983 | Young .................. 370/85.15 |
| 4,445,116 | 4/1984 | Grow .................. 340/825.05 |
| 4,504,946 | 3/1985 | Raychaudhuri .................. 370/95.3 |
| 4,521,880 | 6/1985 | Orsic .................. 370/68 |
| 4,530,092 | 7/1986 | Hafer .................. 370/66 |
| 4,538,147 | 8/1985 | Grow .................. 370/85.5 |
| 4,675,671 | 6/1987 | Ishitaka .................. 370/85.5 |
| 4,731,785 | 3/1988 | Ferenc .................. 370/94.1 |
| 4,748,621 | 5/1988 | Ballance .................. 370/95.3 |
| 4,763,320 | 8/1988 | Rudolph .................. 370/85 |
| 4,763,325 | 8/1988 | Wolfe .................. 370/95.3 |
| 4,769,839 | 9/1988 | Preineder .................. 370/85.15 |
| 4,779,261 | 10/1988 | Yamagishi et al. .................. 370/16 |
| 4,809,270 | 2/1989 | Baxter .................. 370/85.7 |
| 4,878,219 | 10/1989 | Kaufman .................. 370/85.5 |

FOREIGN PATENT DOCUMENTS 56-57350 5/1981 Japan .
56-112158 9/1981 Japan .

*Primary Examiner*—Thomas C. Lee
*Assistant Examiner*—Eric Coleman
*Attorney, Agent, or Firm*—Finnegan, Henderson, Farabow, Garrett, and Dunner

[57] ABSTRACT

An improved time slot allocation method for a loop network. Loop networks in which the present invention is applied include a loop-connecting a control station and a number of branch stations. The control and branch stations each have at least one terminal connected thereto such that interstation communication, when demanded by a terminal, is made by passing a frame through the transmission path. The frame includes a synchronization area for indicating the leading end of the frame, a fixed-length control area, and a data area composed of a plurality of time slots. According to the invention, the control and branch stations are each allocated with a predetermined or unique number of time slots to be used by terminals for interstation communication. When a station has its reserve of unused time slots fall below a preset lower limit, the control station supplements time slots from its own reserve. On the other hand, if a station has its reserve exceed a preset upper limit, the station returns the excess time slots to the control station. Thus, wait times for a communication demand before a line connection is established are reduced, with enhanced control station response. Also, efficiency of time slot use is enhanced, with a considerable reduction in call losses.

4 Claims, 14 Drawing Sheets

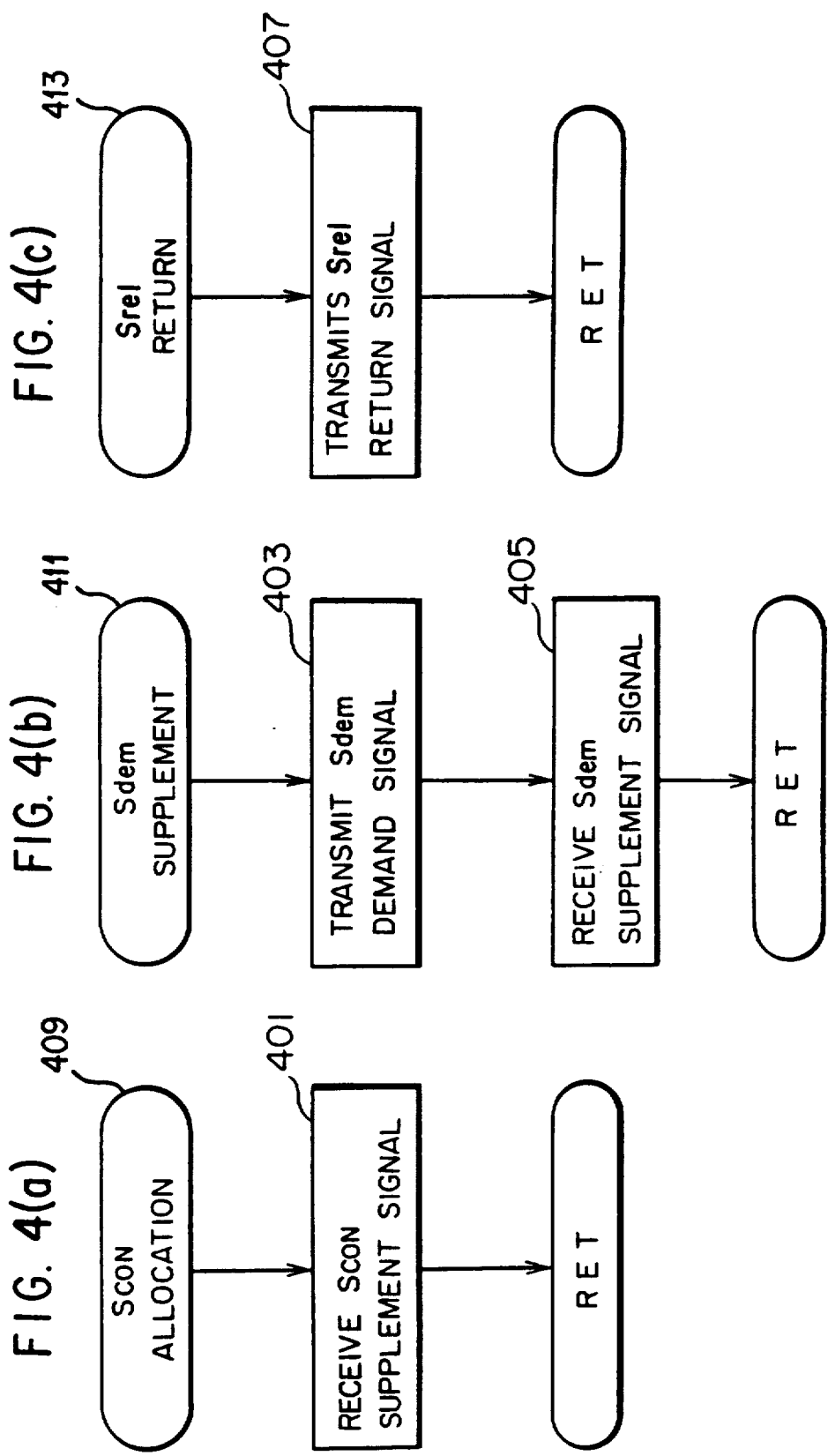

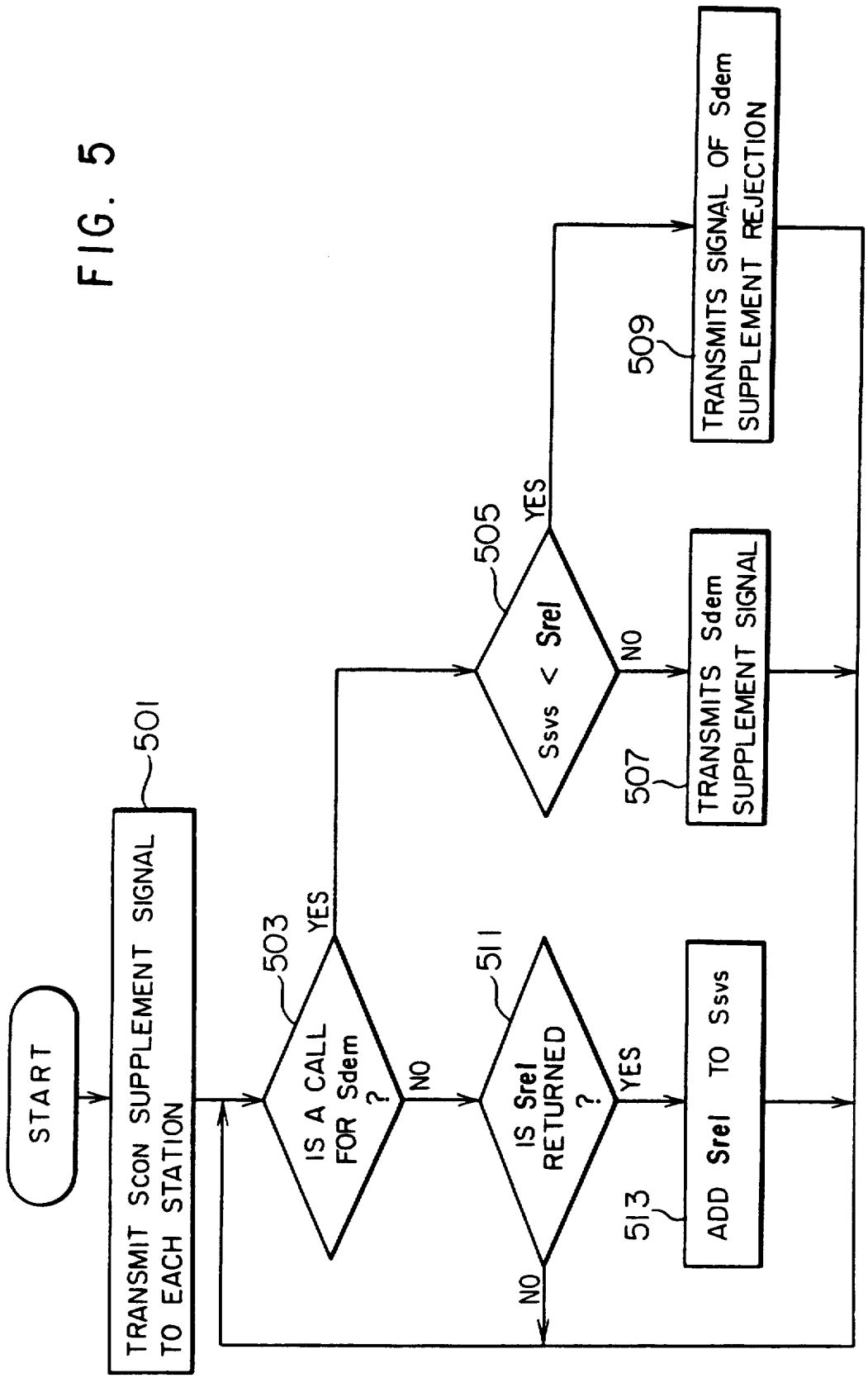

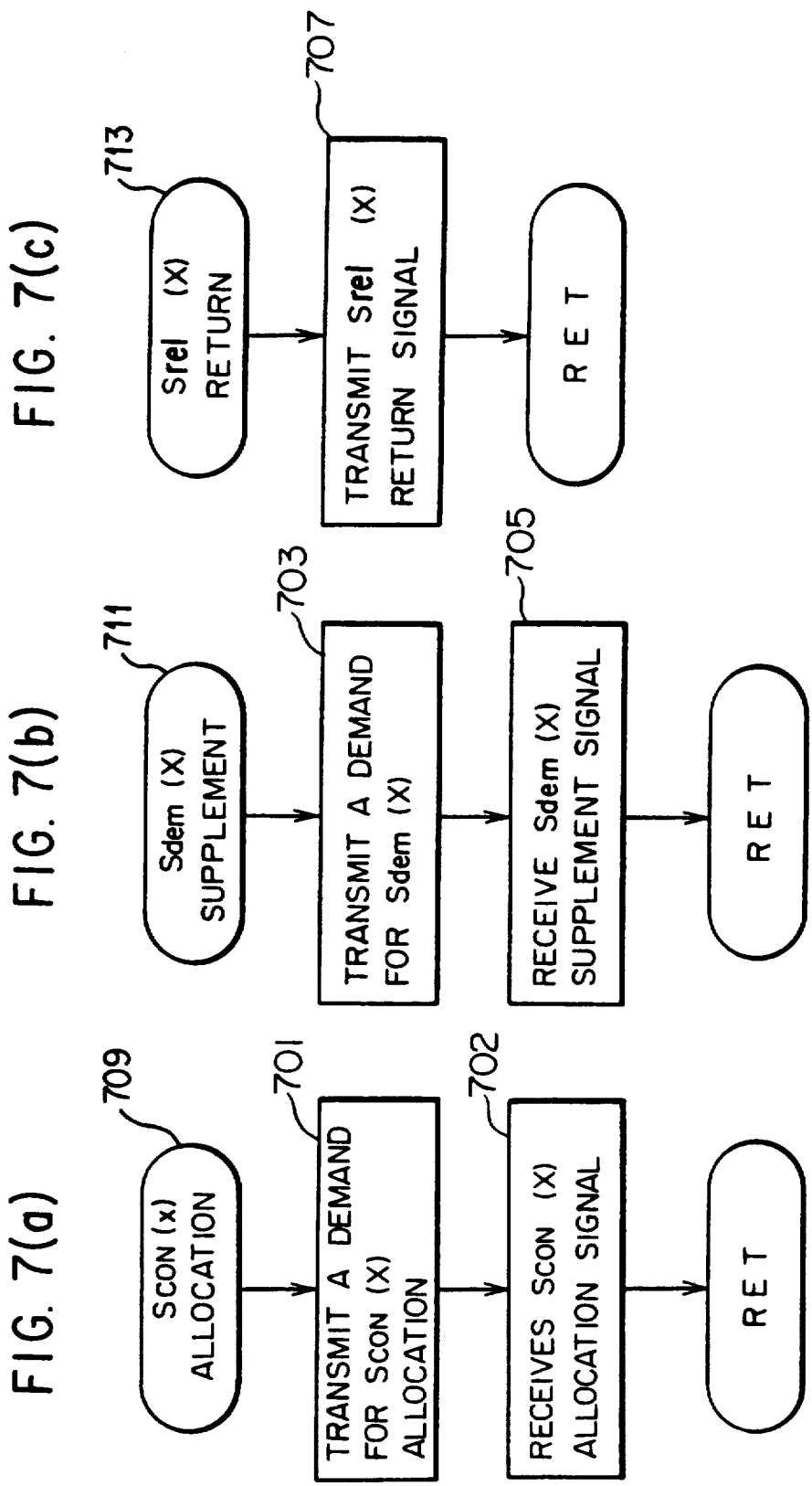

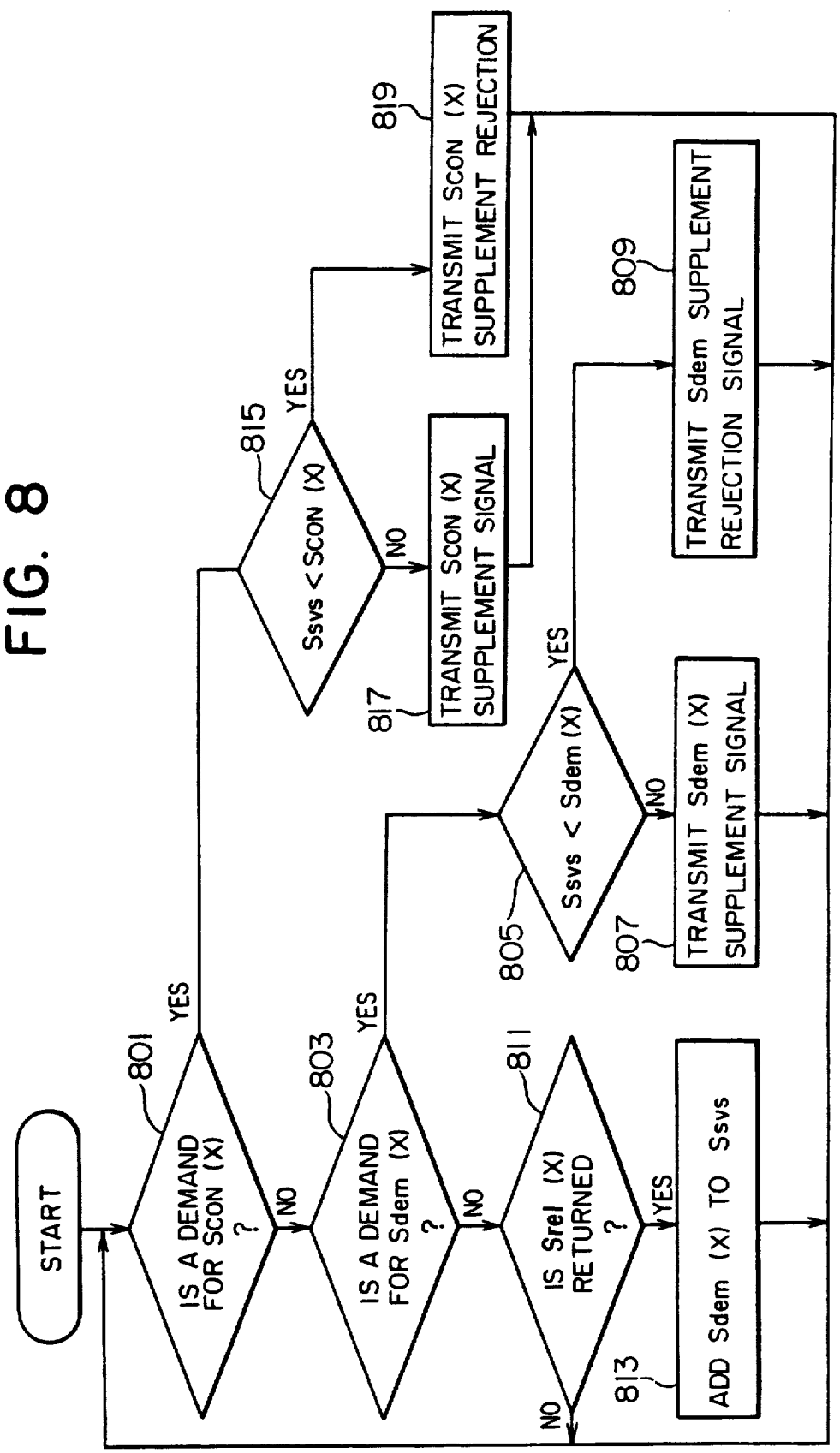

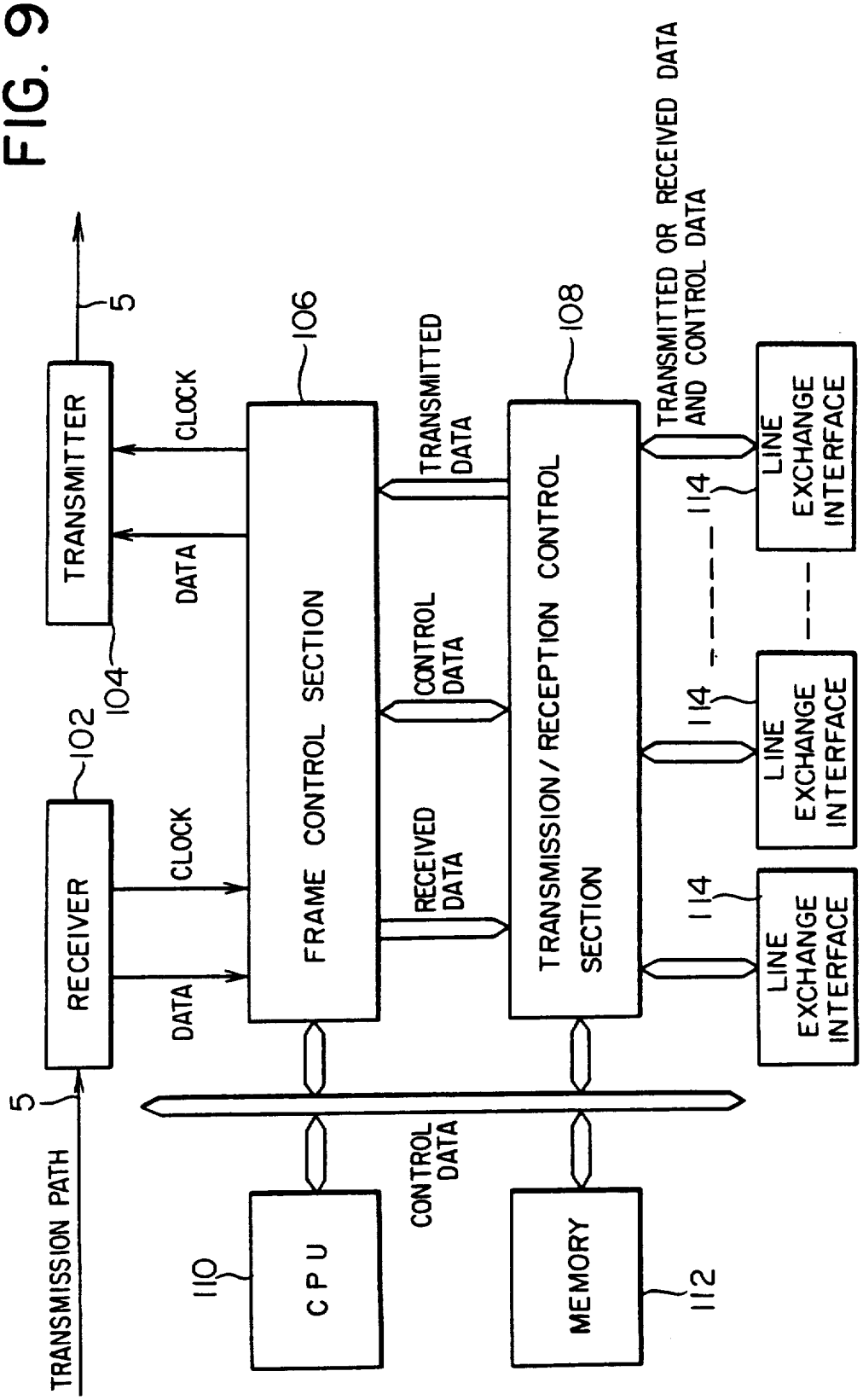

TIME SLOT ALLOCATION FOR LOOP NETWORKS

FIELD OF THE INVENTION

The present invention relates in general to a loop network which is configured by loop-connecting a control station and a number of branch stations through a main transmission path such that interstation communication is made by passing a frame composed of time slots through the path and, in more particular, to a method of time slot allocation for such loop networks.

DESCRIPTION OF THE RELATED ART

With the progress of data processing techniques, various types of systems have been developed to allow data transmission between data processing devices in separate locations which are connected in series or in loop with one another through a common transmission line. In recent years these systems have begun to undergo a further drastic change of system size and capacity as systems have increased in size from, for example, a local area network (LAN) to a metropolitan area network (MAN).

Of these systems, the loop network is one of the most advanced. FIG. 14 is a schematic diagram showing the arrangement of a loop network.

In the figure, the loop network system is configured by connecting a control station (SVS) 1 and a number of branch stations (STN) 3-1, 3-2, . . . 3-n through a main transmission path 5 in loop-like fashion. Transmission path 5 may be an optical fiber.

In a typical application of such a loop network, the control and multiple branch stations each may be connected to terminals, which may be computers or TV conference system, in different locations, so that communications can occur between terminals.

FIG. 15 shows an example of the format for frames employed in data communications in a loop network similar to the one depicted in FIG. 14.

In the figure, the frame 7 is shown to comprise a synchronization area 9 for frame synchronization, a control area 11 and a data area 13 for carrying the data to be transmitted.

The frame synchronization area 9 indicates the leading end of a frame 7. Also, the control area 11, which is preferably of fixed length, carries information for controlling transmission between stations. The data area 13 consists of a plurality of time slots. Data to be transmitted in communication between branch station 3-1, 3-2, . . . 3-n are carried in the slots of the data area 13.

In a loop network with the above-mentioned arrangement, data transmission requires a station to use time slots in which the data to be transmitted are contained. Thus, time slots first have to be allocated to a station wanting to make communications. The two conventional time slot allocation methods are allocation by centralized control and pre-allotment.

In centralized control of time slot allotment, the control station 1 governs the allocation in response to the demand from a branch station 3-1, 3-2 . . . or 3-n. Any branch station seeking to transmit data to another station has to make a demand in the control area 11 of the frame 7 and send it to the control station, which in turn allocates the required number of time data slots to that station. The latter can now transmit the data using the alloted time slots.

FIG. 16 is a diagram illustrating the sequence of operations in which a demand from a branch station 3-1 seeking to call another branch station 3-2 and a response to the demand from the control station 1, are exchanged. FIG. 16 also illustrates the swapping of a call from the branch station 3-1 and a response from the branch station 3-2 to acknowledge reception of the call.

When the branch station 3-1 calls the control station 1 with a demand to transmit data to the branch station 3-2, the control station 1 allots to the station 3-1 the required number of time slots for the data. Then, the branch station 3-1 calls the sought branch station 3-2 for a response indicating the latter is ready to receive the data and a of communications line is established between the involved branch stations 3-1 and 3-2. The data will then be transmitted using the allotted time slots.

Thus, the centralized control of time slot allotment features very high efficiency in the use of time data slots, since allocation is effected only when the need arises.

However, one grave disadvantage with this allocation method is that the transmission of data takes a fairly long time, because before the line of transmission is established the calling branch station has to go through all the procedures with the control station. An additional problem is that, when the control station received too many demands for a call at the same time, calling branch stations have to wait even for the time slots.

In pre-allotment, the branch stations are alloted time slots in advance, relieving the control station of the allocating operation.

In this allotment method, branch stations can transmit data without demanding time slots from the control station. Furthermore, there is no excessive concentration of branch office demands at the control station nor is there a time delay while the line of transmission is established as in the case of centralized allotment control.

The pre-allotment method, however, has the disadvantage that, if a branch station seeking to make new transmission of data has fewer time slots available than required for the data, the network will result in a call loss, even when other branch stations have excess slots. Efficiency in the utilization of time data slots is very low compared with centralized allotment control.

SUMMARY OF THE INVENTION

A primary object of the present invention, therefore, is to provide an improved method of time slot allotment for loop network systems in which the line of transmission for data transfer can be established within a short duration of time of the transfer call.

Another object of the present invention is to provide an improved method of time slot allotment for loop networks in which the response of a control station to branch station demands for data transmission is enhanced, without the control station receiving concentrated data transfer demands.

An additional object of the present invention is to provide an improved method of time slot allotment in which the use of time slots is greatly optimized.

A further object of the present invention is to provide an improved method of time slot allotment for loop networks in which call losses can be substantially minimized.

The method of time slot allotment according to the present invention, proposed to meet the above and other objects, is applied to loop networks in which data transmission between stations is achieved using a frame composed of at least a fixed-length control area and a data area consisting of a number of time slots, the frame being passed through a main common transmission path with respect to which a control station and multiple branch stations are connected in series. In accordance to the time slot allotment method of this invention, the control station, along with each branch station, is pre-assigned with an equal or different number of time slots which, when required, make up the data area of a frame in which the data to be transmitted is carried. A station seeking to deliver data does so by using all or part of the unused time slots pre-assigned to it. When the number of unused time slots pre-assigned to a station falls below a predetermined lower limit, the station is replenished with time slots from the pre-assigned reserve of the control station. In addition, it is so arranged that when the station subsequently comes to have time slots back from the previous used and, with the replenished slots from the control station, has increased the number of slots now standing unused above a predetermined limit, the excess slots are returned to the control station.

With this arrangement, each branch station normally transmits data using time slots pre-assigned to them in an equal or different number, if there are enough slots for the data.

When a branch station has its number of unused time slots decreased below the predetermined lower limit, the station is replenished with slots from the control station so that the branch station can transfer data using the replenished slots together with its own unused slots.

When the number of unused time slots has increased above the predetermined upper limit, the excess slots are returned to the control station.

BRIEF DESCRIPTION OF THE DRAWINGS

FIG. 4(a) is a flowchart showing how time slots are allocated by the control station or the branch station according to the first embodiment of the invention;

FIG. 4(b) is a flowchart showing how time slots are supplied by the control station and the branch station according to the first embodiment of the invention;

FIG. 4(c) is a flowchart showing how time slots are returned by the control station and the branch station according to the first embodiment of the invention;

FIG. 5 is a flowchart showing the replenishment and the return of time slots at the control station according to the first embodiment;

FIG. 7(a) is a flowchart showing how time slots are allocated by the control station or the branch station according to the second embodiment of the invention;

FIG. 7(b) is a flowchart showing how time slots are supplied by the control station and the branch station according to the second embodiment of the invention;

FIG. 7(c) is a flowchart showing how time slots are returned by the control station and the branch station according to the second embodiment of the invention;

FIG. 8 is a flowchart illustrating the replenishment and the return of time slots at the control station according to the second embodiment;

FIG. 9 is a block diagram showing the arrangement of the control and branch stations in accordance with the second embodiment;

DETAILED DESCRIPTION OF THE PREFERRED EMBODIMENTS

Preferred embodiments of the present invention will be described in accordance with the accompanying drawings.

Figure 14:
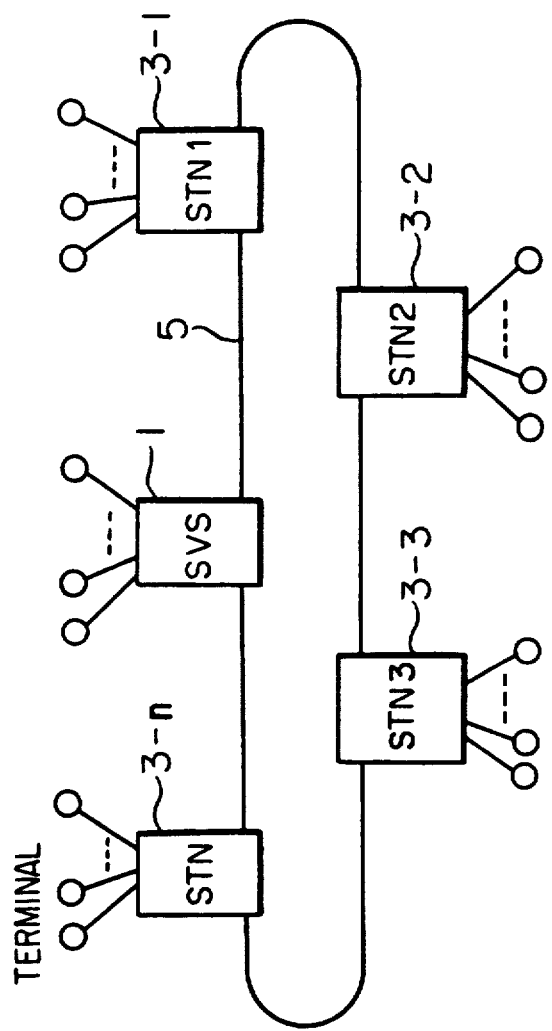
FIG. 14 is a schematic view of the arrangement of a loop network system.
Figure 15:
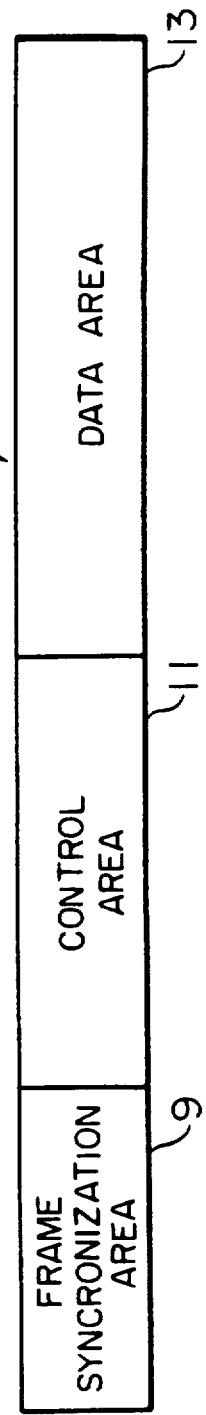
FIG. 15 is a view illustrating the format for frames employed in a loop network according to the present invention.
Figure 16:
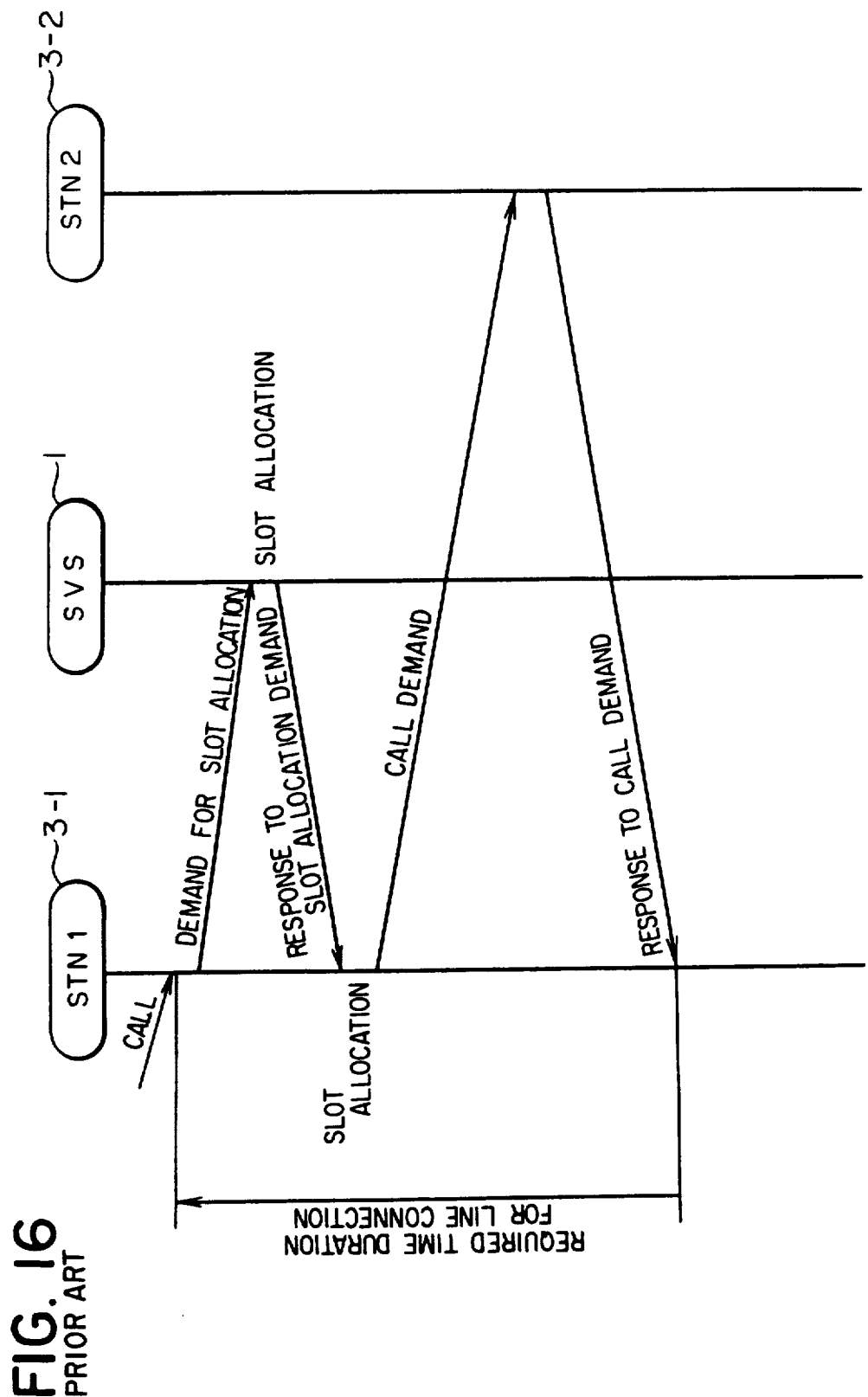
FIG. 16 is a view showing the exchange of calls and responses between stations in a conventional loop network system.

Prior to going into detail, it is important to note that the loop networks described in connection with the preferred embodiments of the present invention are substantially similar in construction to the conventional one shown in FIG. 14. Also, the method of time slot allotment according to the invention utilizes the same frame format as the conventional frame illustrated in FIG. 15. Accordingly, when a loop network or the format of a frame is referred to in connection with the present invention, the same description will be omitted for brevity's sake. Also, in the descriptions which follow, like parts are referred to by like reference numerals. In addition, data in time slots are represented as a signal system mB1C encoder, i.e., m-bit data and one complementary bit C.

The description will be started with the details of the control station 1 and branch stations 3-1, 3-2 . . . 3-n making up the loop network to which the present invention is applied. Since the control station 1 is substantially similar in construction to each branch station 3-1, 3-2 . . . 3-n, it should be understood that the description of the structure of one station is applied to other stations.

FIG. 9 is a block diagram showing the construction of these stations 1, 3-1, 3-2 ... 3-n.

As shown in the figure, the station comprises a transmitter 104, a receiver 102, a frame control section 106, a transmission/reception control section 108, a CPU 110, a memory 112, and line switching interfaces 114.

The receiver 102 recovers a clock from the frame synchronization area of the serial data it receives from the transmission path 5 and delivers the recovered clock and received data to the frame control section 106.

The transmitter 104 receives data and clocks from the frame control section 106, synchronizes the received data with the timing of the clock into a serial data, and sends the serial data to the transmission path 5.

The frame control section 106 monitors receives data through the receiver 102 to detect whether the received data carries a frame, and, upon detection of a frame, outputs the data as parallel data to the transmission/reception control section 108.

The transmission/reception control section 108 receives parallel data from the frame control section 106 and allocates the parallel data between ports according to the time slot numbers.

At configuration time, CPU sets the starting and ending time slot numbers written in the frame control area in the registers of a control section, which will be described later at the transmission/reception control section 108. Also, CPU 110 sets the starting and ending numbers of the time slots written in the frame data area 13 in the line exchange interfaces 114. In addition, CPU 110 sets a table of information as to the exchange of data between the buffers, which will later be described, of the line exchange interfaces 114. This is done in accordance with the information of a control packet received by CPU 110 through the control section of the transmission/reception control section 108 during the takeover or release of the transmission path, which will be described later.

The memory 112 stores a program for controlling CPU 110, information as to whether each time slot is loaded or not, and a table of how the time slots are allocated to each branch station 3-1, 3-2 ... 3-n.

Figure 10:
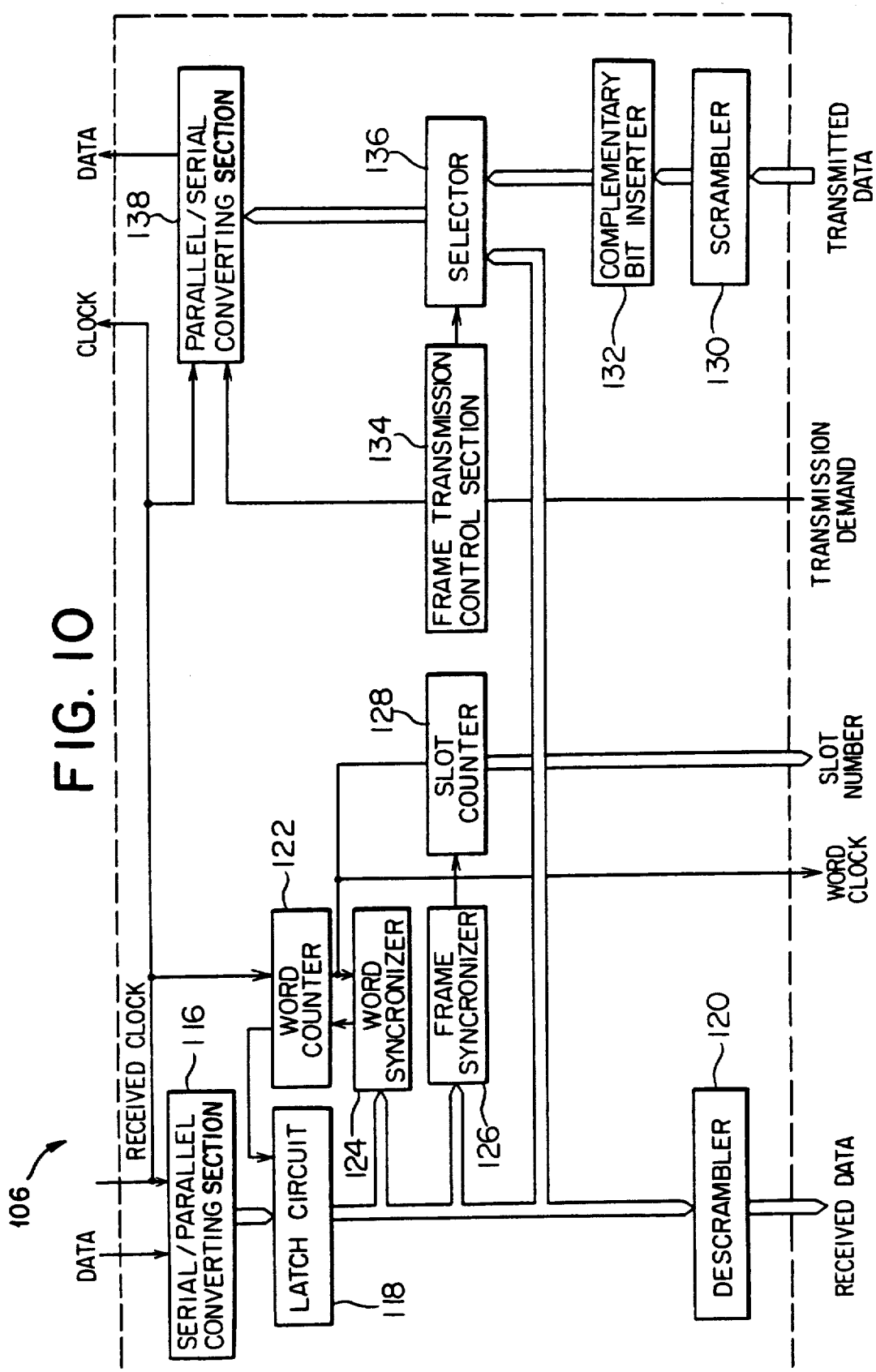
FIG. 10 is a block diagram showing the structure of the frame control section in FIG. 9.

FIG. 10 is a detailed block diagram illustrating the frame control section 106.

As shown in the figure, the frame control section 106 consists of serial/parallel converting circuit 116, a latch circuit 118, a descrambler 120, a word counter 122, a word synchronizer 124, a frame synchronizer 126, a slot counter 128, a scrambler 130, a complementary bit inserter 132, a frame transmission control section 134, a selector 136 and a parallel/serial converting section 138.

The serial/parallel converting section 116 receives data and clocks from the receiver 102. The latch circuit 118 latches a data signal it receives from the serial/parallel converting section 116 with the clock transmitted from the word counter 122.

The data signal, after being latched over a predetermined period of time by the latch circuit 118, is then transmitted to the word synchronizer 124, the frame synchronizer 126, the selector 136, and the descrambler 120.

The descrambler 120 sends data signals received from the latch circuit 118 to the transmission/reception control section 108 of FIG. 9.

The word synchronizer 124 checks whether the data signal received from the latch circuit 118 is in synchronization in conjunction with the word counter 122. The word synchronizer 124 conducts constant monitoring by a complementary bit check to detect whether the data signal is out of word synchronization, and determines out-of-step synchronization based on the number of repeated complementary bit errors. The number of error repetitions required before the signal is declared to be out of synchronization may be determined according to the purposes for which the present invention is employed.

The signal data declared by the word synchronizer 124 as out of synchronization is delivered to the word counter 122 which, in turn, adjusts the clock input to the latch circuit 118 so that latch timing is shifted by one bit. Then, the work synchronizer checks on signals, now shifted by one bit, for out-of-step synchronization. If not, the word counter 122 again adjusts the clock input to the latch circuit to bring about a one-bit shift of latching time. This process is repeated until word synchronization is established.

The frame synchronizer 126 initializes the slot counter 128 upon detecting a unique pattern which does not appear in the frame synchronization area 9, the control area 11, or the data area 13 in a frame.

The slot counter 128, upon being initialized by the frame synchronizer 126, starts counting each word output from the word counter 122, and transmits the counts as the number of slots, together with the word clock and received data, to the transmission/reception control section 108 of FIG. 9.

The transmission/reception control section 108 transmits data to the selector 136. Before the selector 136, a complementary bit is inserted into the data by the complementary bit inserter 132 through the scramber 130.

The selector 136 selects between the data from the latch circuit 118 and the complementary bit inserter 132 under the direction of the frame transmission control section 134 and selected data to the parallel/serial converting section 138. Also, the parallel/serial converting section 138 converts the parallel data from the selector 136 into serial data and outputs the data to the transmitter 104 of FIG. 9.

Figure 11:
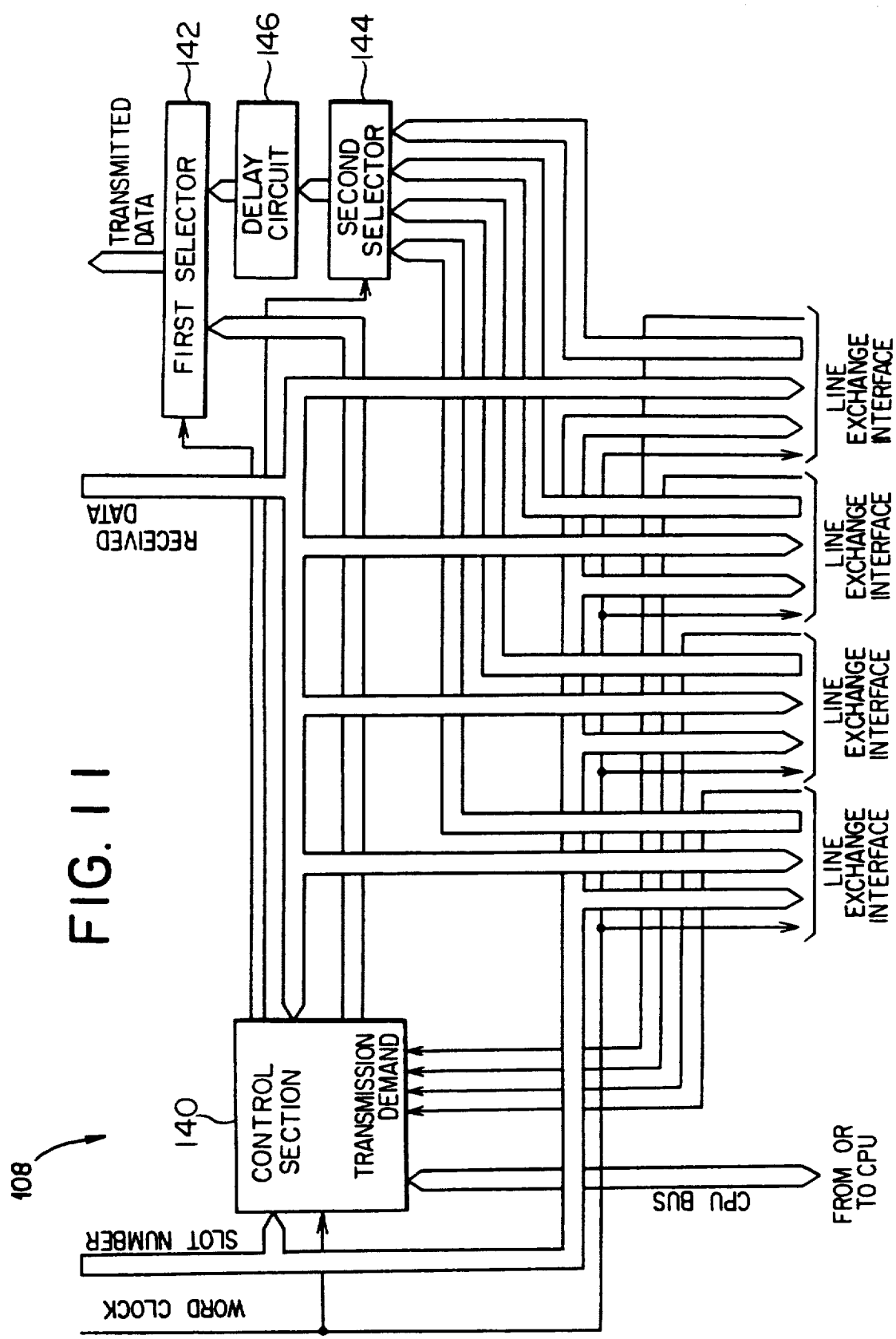
FIG. 11 is a block diagram showing the structure of the transmission/reception control section in FIG. 9.

FIG. 11 is a detailed diagram showing the structure of the transmission/reception control section 108.

As shown, the transmission/reception control section 108 comprises a control section 140, a first selector 142, a second selector 144, and a delay circuit 146.

The control section 140 transmits or receives control data by packets using the control area 11 of a frame 7 under the control of CPU 110.

Data detection of frame control area 11 by the control section 140 is programmed in CPU 110 at the time of system configuration, so that CPU 110 sets the starting and ending time slot numbers written in the control area 11 of a frame in the registers (not shown) of the control section 140. Thus, data detection is achieved by comparing the output from the slot counter 128 and the starting and ending time slot numbers set in the registers.

The control section 140 of each station conducts constant monitoring of transmitted and received data to determine whether the control area 11 of a frame indicates a packet being addressed to the station and, if so, receives the data. Also, in the case of data to be transmitted from the station, the control section 140 allocates a required number of unused packets through wwhich to send the data. This may preferably be done by designing the frame into a format including information as to whether a given packet is used or not. When the control section 140 detects data adressed to its station, it delivers the data to CPU 110 through its buffers, not shown. In the case of data not adressed to its station, the control section 140 outputs the data, with its control area 11 and data area 13 intact. On demand for data transmission from a line exchange interface 114, the control section 140 switches between the first and second selector 142 and 144 so as to control the transmission of data from line exchange interface 114 to the frame control section 106.

The first and second selectors 142 and 144 control the transmission and reception of data under the direction of the control section 140.

The first selector 142 selects the outputs both from the control section 140 and the delay circuit 146.

The second selector 144 selects data to be transmitted from the line exchange interface 114.

The delay circuit 146 creates a delay in accordance with the control section 140.

Figure 12:
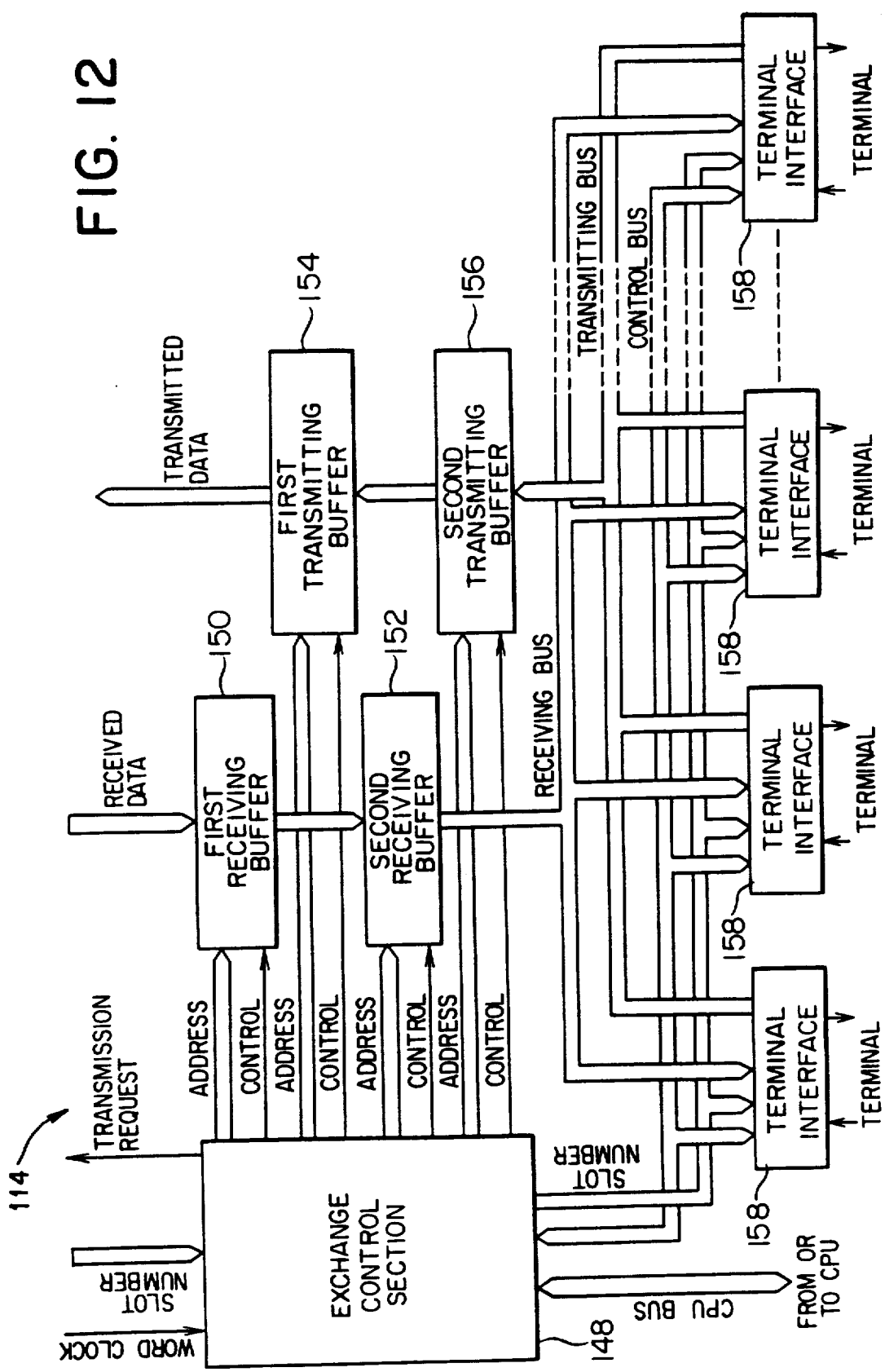
FIG. 12 is a block diagram showing the structure of the line switching interface in FIG. 9.

FIG. 12 is a detailed diagram illustrating the line exchange interface 114 in block form.

As shown, the line exchange interface 114 consists of an exchange control section 148, a first receiving buffer 150, a second receiving buffer 152, a first transmitting buffer 154, a second transmitting buffer 156, and a plurality of terminal interface 158.

The exchange control section 148 receives word clocks and slot numbers, from the transmission/reception control section 108. It also, it inputs information employed to update a data table concerning the shifting of data between the first and second receiving buffers 150 and 152 and between the first and second transmitting buffers 154 and 156 in accordance to an order sent from the transmission/reception control section 108 through CPU 110. In addition, the exchange control section 148 receives control information, such as a call from a terminal interface 158 requesting the takeover or release of the transmission path. Furthermore, the exchange control section 148 outputs a demand for transmission to the transmission/reception control section 108, outputs slot numbers to terminal interface 158, controls write/read operations in each of the buffers, outputs control information such as a response to a terminal interface 158 concerning the takeover or release of the transmission path, and outputs a demand to the transmission/reception control section 108 through CPU 110. The exchange control, section 148 writes received data in the first receiving buffer 150 at the address and with the timing corresponding the time slot number in the data. The address of the second buffer 152 from which data is read the timing of readout also indicated by the exchange control section 148. Data transmission between the first and the second receiving buffers 150 and 152 is done by the exchange control section 148 in reference to a table of information concerning the shifting of data between the receiving buffers 150 and 152.

In a similar manner, the exchange control section 148 reads data to be transmitted from the first transmitting buffer 154 at the address and with the timing corresponding to the slot number in the data. The address of the second transmitting buffer 156 into which data is written and the timing of data writing are also indicated by the exchange control section 148. In addition, data transmission between the first and second transmitting buffers 154 and 156 is done by the exchange control section 148 in reference to a table of information concerning the shifting of data between the buffers 154 and 156.

Furthermore, the exchange control section 148, in its takeover or release of the transmission path to a terminal interface 158, sets or resets the starting and ending registers in that interface.

These buffers transmit or receive data under the control of the exchange control section 148. The terminal interfaces 158 holds data for transmission to or reception from a terminal between a starting and an ending registers in the terminal interfaces 158.

Also, the terminal interfaces 158 exchange with the exchange control section 148 control data such as a call for transmission or a response to such a call through a control bus.

Figure 13A:
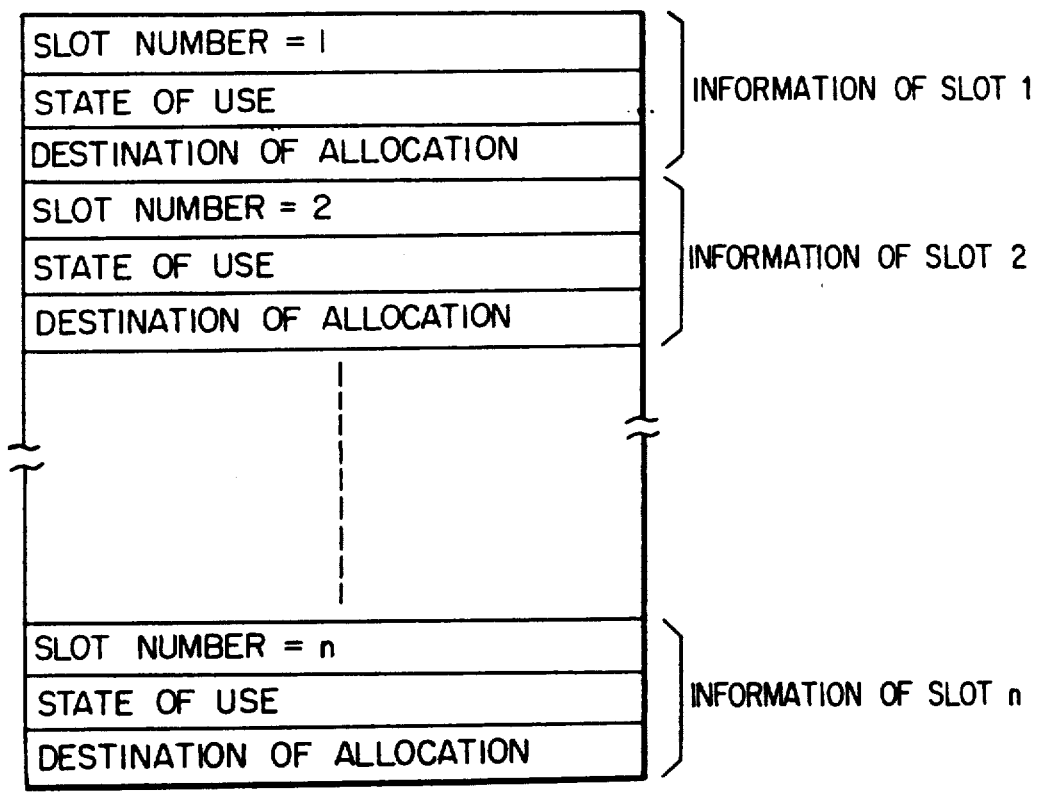
FIG. 13(a) and 13(b) are charts explaining the map of the memory in FIG. 9.
Figure 13B:
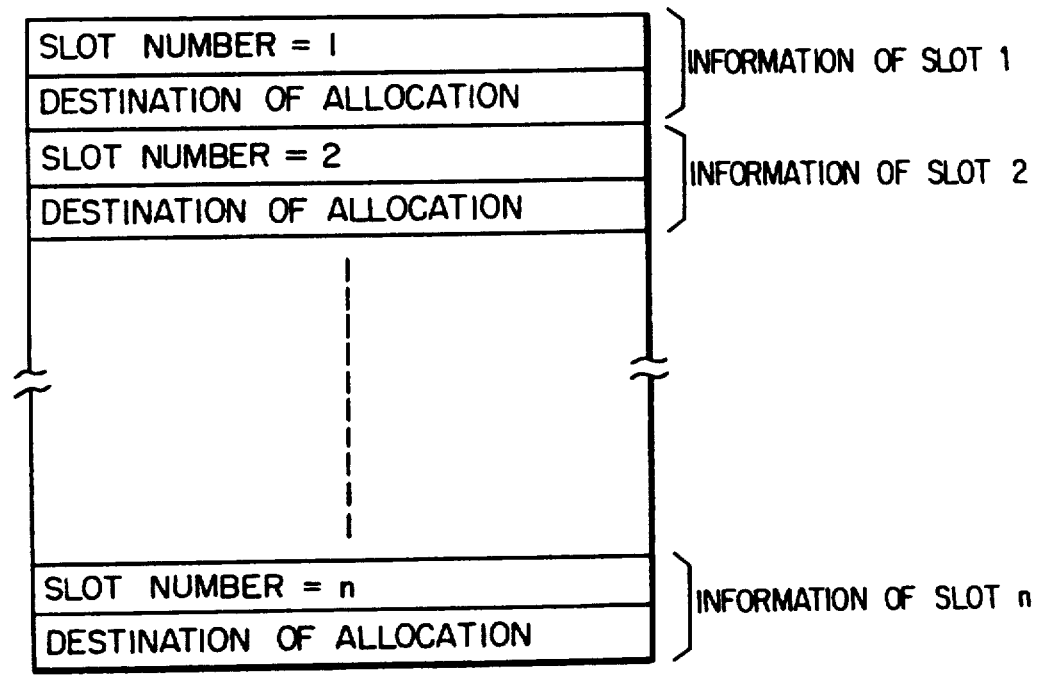

FIGS. 13(a) and 13(b) are detailed diagrams showing the format of table of information, as mapped in the memory 112, about whether each time slot is in use or not and the allocation of time slots to branch stations 3-1, 3-2 . . . 3-n.

As shown in FIG. 13(a), a table of information in the memory 112 comprises three kinds of information for each time slot; time slot member, state of use, and destination of allocation.

Here, a slot number refers to the time slot number, i.e., a serial number, in the data area 13 of a frame.

Also, the area "state of use" indicates whether the time slot is allocated and to which branch station it is allocated.

Figure 3C:
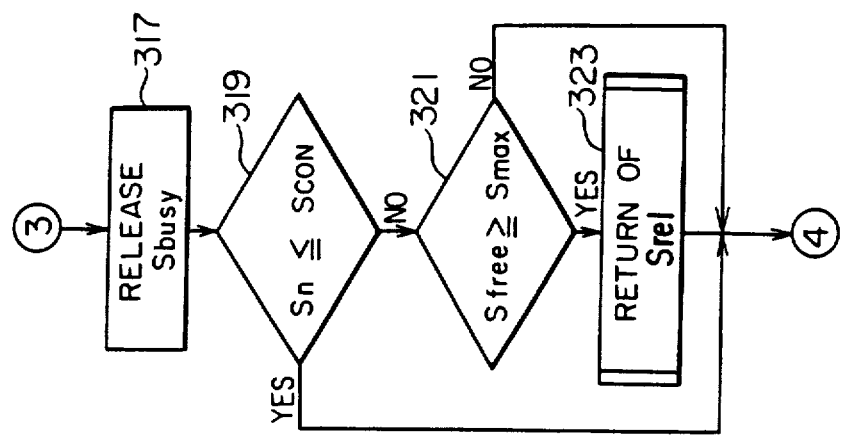
FIG. 3(c) is a flowchart showing how time slots are released by the branch station according to the first embodiment of the invention.
Figure 3B:
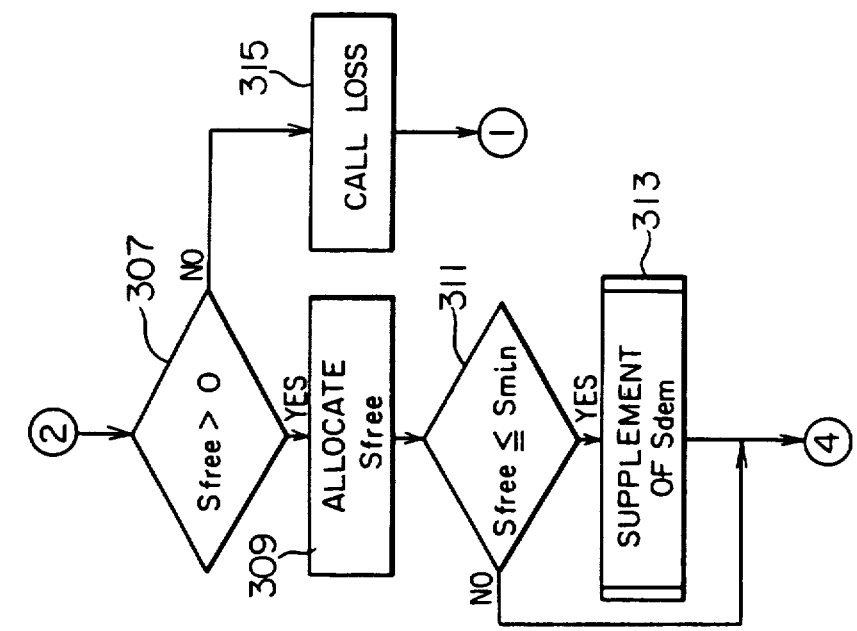
FIG. 3(b) is a flowchart showing how time slots are allocated or supplied by the branch station according to the first embodiment of the invention.
Figure 6C:
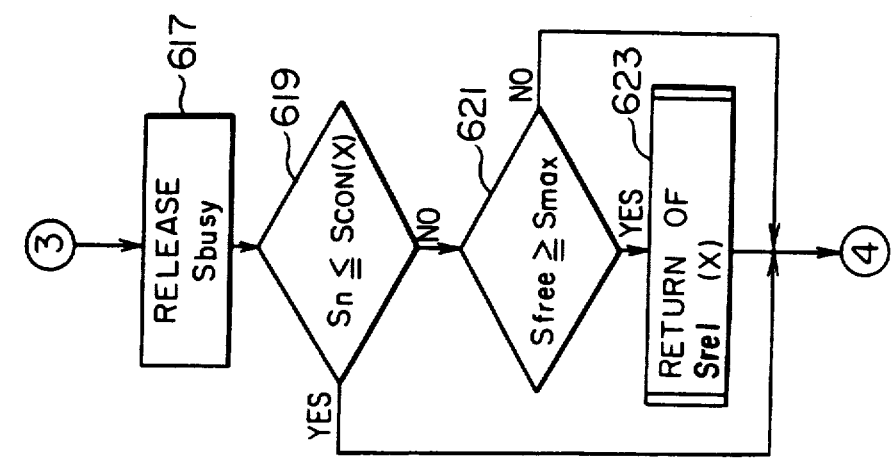
FIG. 6(c) is a flowchart showing how time slots are released by the branch station according to the second embodiment of the invention.
Figure 6B:
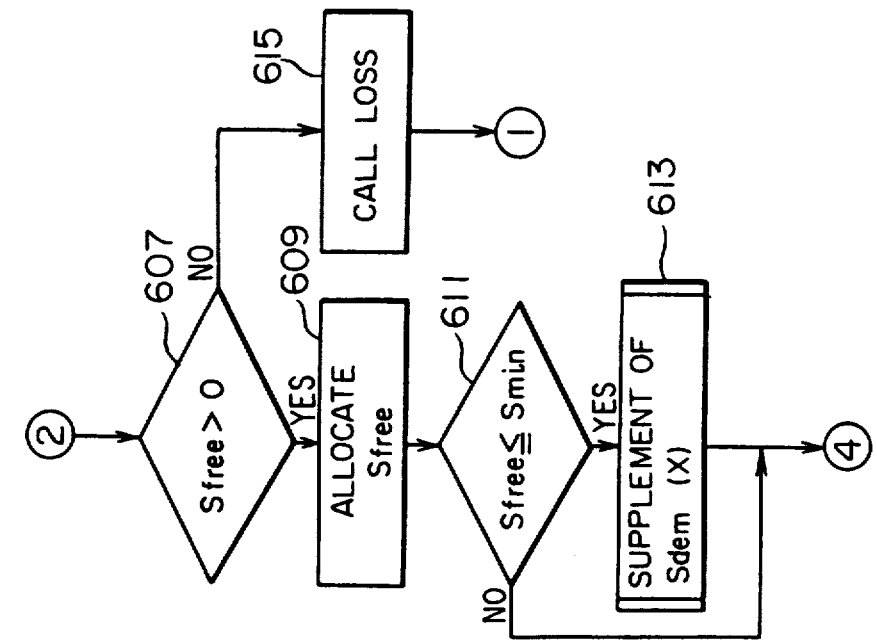
FIG. 6(b) is a flowchart showing how time slots are allocated or supplied by the branch station according to the second embodiment of the invention.

With respect to Step 309 in FIG. 3(b) or Step 609 in FIG. 6(b), for example, when CPU 110 allocates time slots to a branch station, it refers to the memory 112 to retrieve unused time slots by reading through the state of use area, and sets a table of information concerning the shifting of data between the buffers in the line exchange interface 114 according to the retrieved time slot number, and allocates the slots to the branch station. At the same time, CPU 110 updates the table in the memory 112 to indicate that the time slots allocated are in use.

With respect to Steps 317 in FIG. 3(c) or Step 617 in FIG. 6(c), for example, when CPU 110 recovers the time slots from a branch station, it resets the table containing information concerning the shifting of data between the buffers of the line exchange interface 114 and recovers the slots. At the same time, CPU 110 updates the memory 112 to indicate that the recovered time slots are not in use.

Also, CPU 110 has the number of unused slots ($S_{free}$) counted at the time of each allocation or recovery of time slots.

In the memory 112, the destination area for each time slot indicates if the time slot is allocated to a particular station, or is not allocated to any station, or is reserved by the control station 1. A station 3-1, 3-2 . . . 3-n determines the allocation or return of time slots according to information in the destination of allocation area through its terminals.

Referring to Step 313 in FIG. 3(b) or Step 613 in FIG. 6(b), when CPU 110 allocates a number of time slots to a branch station 3-1, 3-2 . . . 3-n, it updates the destination of allocation area for each of the plural allocated time slots to indicate that they can be used by that station. Referring then to Step 323 in FIG. 3(c) or Step 623 in FIG. 6(c), when CPU 110 recovers the time slots from a branch station 3-1, 3-2 . . . 3-n, it updates the destination of allocation area for each of the plural time slots to indicate that they can not be used by that branch station.

The above-described table is formed in the memory 112 of each station 3-1, 3-2 ... 3-n including the control station 1.

A table of information showing the allocation of time slots to branch station 3-1, 3-2, ... 3-n comprises two areas for each time slot, i.e., time slot number and destination of allocation, as illustrated in FIG. 13(b). A time slot number is the number of a time slot, i.e., a serial number, written in the data area 13 of a frame 7. The destination of allocation area contains the number of the branch station to which the time slot is allocated. Time slots currently not any branch station and reserved by the control station 1 are so noted in the respective areas of the table.

When CPU 110 of the control station 1 allocates time slots to a branch station (for example, Steps 501 and 507 in the flowchart in FIG. 5, Steps 817 and 807 of the flowchart in FIG. 8), it writes the number of that branch station in the destination of allocation area for each of the allocated slots in the memory. Also, with respect to Step 513 in FIG. 5 or Step 813 in FIG. 8, when the time slots are returned to the control station 1, its CPU 110 writes in the destination of allocation area for each of the returned slots information that the slot is reserved by the control station 1. In addition, CPU 110 of the control station 1 keeps track of the number of unused time slots at the moment of the allocation or recovery of time slots.

The above-described table is formed in the memory 112 of the control station 1.

Since the system of the present invention has been described, operation of the system will now be explained to provide further understanding of the invention. It is important to note that the control station 1 and each of the branch stations 3-1, 3-2, ... 3-n operate under the direction of their respective CPU 110 in the system structure described above in association with FIGS. 9 through 13. Also, CPU 110 is controlled by a program stored in its memory 112.

Figure 1:
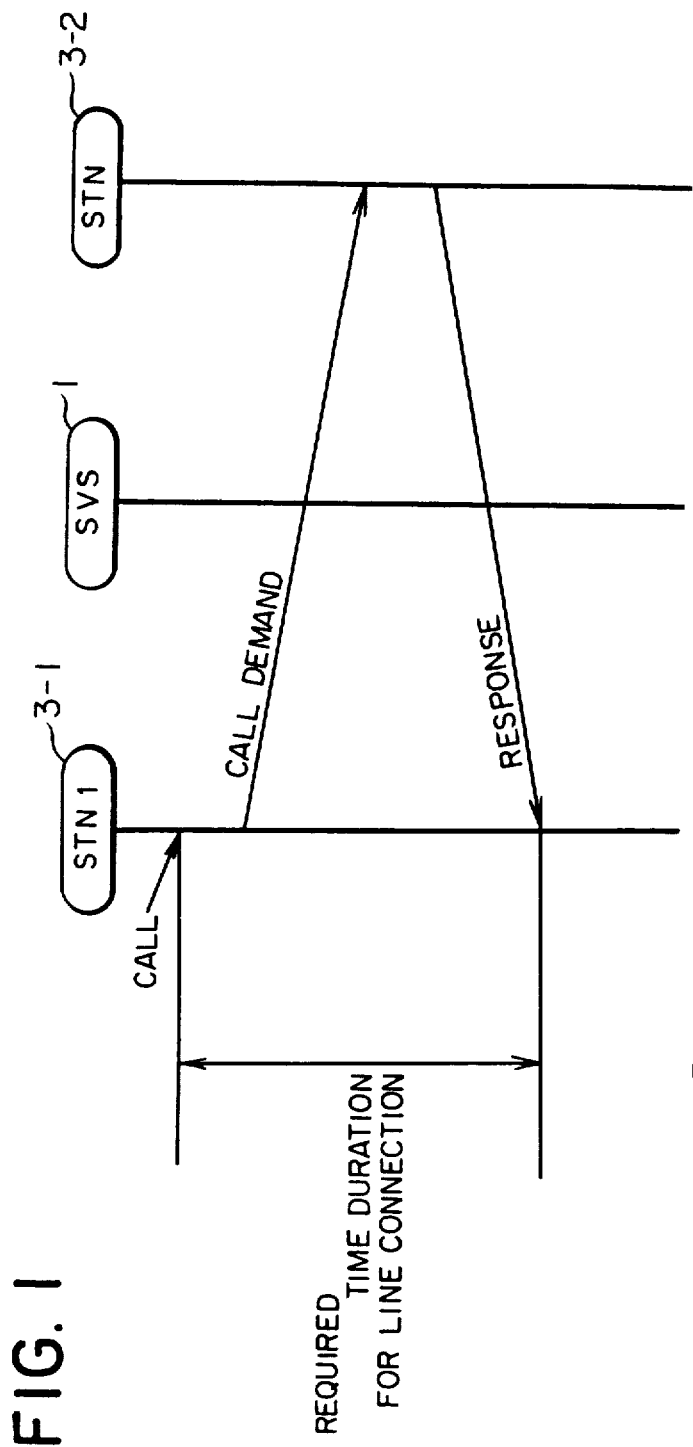
FIG. 1 is a diagram illustrating the exchange of calls and responses between stations in a loop network using the time slot allotment method according to the present invention.

FIG. 1 is a diagram showing the exchange of call demand and response.

When a terminal in the branch station 3-1 makes a call request to a terminal in the branch station 3-2, the station 3-1 retrieves a number of time slots from the slots allocated to it and makes a call request to the branch station 3-2. When the called terminal in the station 3-2 is available to access, the station 3-2 makes a response call to the station 3-1. The calling and called terminals in the stations 3-1 and 3-2, following the above steps, can exchange information using the retrieved time slots. However, the above description only applies to a normal case where the line connection is completed normally, as when there are sufficient time slots for the data transmission. When a calling station has no available time slots left, the required number of slots has to be allocated in the following manner.

Figure 2:
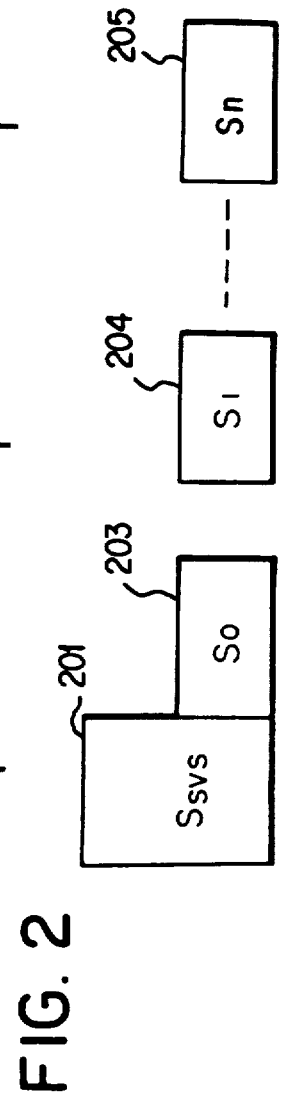
FIG. 2 is a diagram showing the allotment of time slots in accordance with a first embodiment of the present invention.

Referring to FIG. 2, the control station 1 provides separate control over two types of time slots: $S_{svs}$ (svs means "slave-slot") 201 and $S_o$ 203. The slots $S_{svs}$ 201 are used to allocate to a branch station seeking slots for data communications and the slots $S_o$ 203 are for establishing a line in response to a demand for line connection from terminals connected to the station 1. The branch stations 3-1, 3-2, ... 3-n control only time slots $S_1$ 204, ... $S_n$ 205 for line connection.

Thus, when a terminal makes a call request, the associated station, whether control or branch, selects from the allocated slots and allots the required number of slots for data communication. As result, the total number of available slots in the station may fall to a predetermined lower limit. When this happens, plural time slots are allocated to the station from the reserved slots $S_{svs}$ in the control station 1.

When the terminal releases the time slots at the end of the communications so that the associated branch station has unused slots increase to a predetermined upper limit, it returns the excess slots to the control station.

The above-described processing is executed as a background operation to the processing for data transmission and reception between branch stations 3-1, 3-2, ... 3-n.

However, there is a limit to the number of available slots, and the allocation and release of slots as well as their supplement and return are restrained. Thus, operation, together with restraints upon operation, will be described in detail in conjunction with FIGS. 3 through 5.

Information as to slot supplement/return is transmitted or received between the control and branch station as information in the control area of a frame. The information consists of the number of time slots involved. A slot number is a serial number assigned to an individual time slot as represented in a frame.

FIG. 3 is a flowchart showing the allocation and release of time slots for branch stations 3-1, 3-2, ... 3-n. FIG. 4 is also a flowchart illustrating the supplement and return of reserved time slots between the control station 1 and a branch station 3-1, 3-2, ... 3-n, as viewed from the standpoint of the branch station. FIG. 5 is a flowchart showing the supplement and return of reserved time slots between the control station 1 and a branch station 3-1, 3-2, ... 3-n, as viewed from the standpoint of the control station.

The control station 1, in its operations as shown in the flowcharts of FIGS. 3 through 4, controls both its time slots $S_o$ employed to establish interstation line connection in response to a demand from its own terminals and its reserve of supplementary time slots $S_{svs}$ employed for slot supplement in response to a demand from branch stations 3-1, 3-2, ... 3-n. Each branch station 3-1, 3-2, ... 3-n controls its own time slots employed to establish interstation line connection as illustrated in the flowcharts of FIGS. 3 and 4.

Figure 3A:
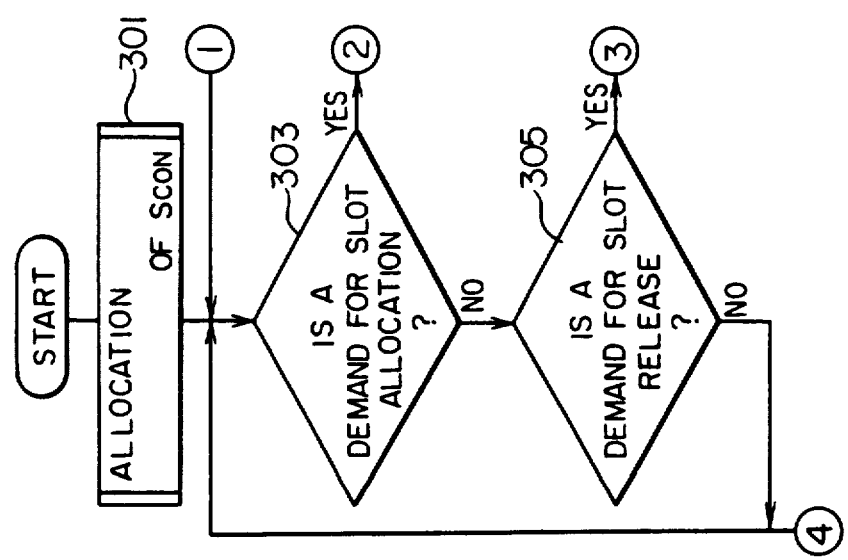
FIG. 3(a) is a flowchart showing how time slots are allocated or released by the branch station and the terminal device according to the first embodiment of the invention.

In the slot allocation/release operation, as illustrated in FIG. 3(a), the control station allocates an initial number of reserved time slots $S_{con}$ to each of the stations including itself. This $S_{con}$ (cpn means "commencement") allocation operation (Step 301) is carried out at the time of system initialization.

When a branch station 3-1, 3-2, ... 3-n receives a demand for time slot allocation from one of its terminals (Step 303), the branch station performs the operation shown in FIG. 3(b). Furthermore, when the terminal, after completing its data transmission, makes a demand to release the allocated time slots (Step 305), the branch station performs the operations shown in FIG. 3(c).

Thus, a branch station allocates free time slots $S_{free}$ from its own reserve in response to a terminal demand for slot allocation (Steps 307 and 309), providing there are sufficient free time slots. As a result, the branch station may have its reserve of free time slots $S_{free}$ decrease to the lower limit $S_{min}$ (min means "minimum") (Step 311). If this happens, the branch station makes a demand for time slot supplement of the control station 1. To meet this demand, the control station 1 performs the $S_{dem}$ (dem means "demand") supplement operation (Step 313) in which the reserve of the branch station is replenished with a plurality of supplementary time slots $S_{dem}$.

However, it may happen that the control station 1 has not held sufficient supplementary slots to meet the demand from a branch station 3-1, 3-2, . . . 3-n for the required number of supplementary time slots $S_{dem}$, so that the control station cannot complete the $S_{dem}$ supplement operation.

Despite this disabled condition, there may be a further demand for time slot allocation from other branch station terminals, so that the reserve of free slots $S_{free}$ of the branch station falls below the lower limit $S_{min}$ or so that the branch station has no free slots left at all. In this particular embodiment, any demand for slot allocation when the station has no free time slots $S_{free}$ is processed as a call loss (Step 315).

When a branch station 3-1, 3-2, . . . 3-n receives a terminal demand for release of the time slots $S_{busy}$, the station performs the $S_{busy}$ release operation (Step 317).

As a result of the release of time slots $S_{busy}$, the time slots $S_{free}$ increase. When the number of time slots $S_n$ reserved in the branch station 3-n ($S_n$ is the sum of the time slots $S_{free}$ and the time slots $S_{busy}$) is more than the originally allocated time slots $S_{con}$ (Step 319) and the number of time slots $S_{free}$ is more than the upper limit $S_{max}$ (max means "maximum") (Step 321), the branch station 3-n returns a plurality of the time slots $S_{rel}$ (rel means "release") from the time slots $S_{free}$ to the control station 1. When the number of time slots $S_n$ is not more than the originally allocated time slots $S_{con}$ (Step 319), the branch station 3-n does not return the time slots $S_{rel}$ to the control station 1.

In the time slot supplement and return operation, as viewed from the standpoint of a branch station, when a station, whether control or branch, is originally allocated with time slots $S_{con}$ in the $S_{con}$ allocation operation (Step 409) shown in FIG. 4(a), the station remains in a waiting condition until the initial reserve of time slots $S_{con}$ is received from the control station 1 (Step 401). This $S_{con}$ allocation operation is completed when a supplement signal is received.

When a station, whether control or branch, has its reserve of free time slots $S_{free}$ decrease to the lower limit $S_{min}$ (Step 411), the station transmits a signal demanding for slot supplement to the control station 1 and enters a waiting condition (Step 403). When the control station 1 has its reserve of supplementary time slots $S_{svs}$ increase above the demanded number of time slots $S_{dem}$, the control station supplies the station which made the demand with the slots $S_{dem}$. This $S_{dem}$ supplement operation is completed when a $S_{dem}$ supplement signal issued from the control station 1 is received by the station which made the demand (Step 405).

This $S_{dem}$ supplement operation is activated by a signal demanding time slot supplement issued from a station when its reserve $S_{free}$ has reached the lower limit $S_{min}$. However, all the rest of the operation including actual slot supplement is completed as a background asynchronous process, independently of the line connection.

Furthermore, when a branch station 3-1, 3-2, . . . 3-n has its reserve of free time slots $S_{free}$ to increase to the upper limit $S_{max}$ (Step 413), the station returns excess slots $S_{rel}$ to the control station and transmits a signal indicating the time slot return (Step 407), completing the $S_{rel}$ return operation.

The control station performs the initial $S_{con}$ allocation and reserve slot supplement/return operations, as illustrated in FIG. 5, to provide control reserved time slots $S_{svs}$ for slot supplement to branch stations 3-1, 3-2, . . . 3-n.

The initial $S_{con}$ allocation operation is carried out at the time of system initialization by allocating an initial reserve of time slots to each of the stations including the control station (Step 501).

Furthermore, the control station 1, in response to a demand for time slot supplement (Step 503) from a branch station 3-1, 3-2, . . . 3-n, replenishes the reserve with a plurality of supplementary time slots $S_{dem}$ (Step 507). However, if the reserve of supplementary time slots $S_{svs}$ at the control station 1 is below the demanded number of slots $S_{dem}$ (Step 505), no replenishment of slots takes places to a branch station (Step 509).

This embodiment improves upon the conventional methods of time slot allotment by central control fixed allotment. The above-described first embodiment has performance characteristics such as low call loss rate and a shorter lapse of time before line connection is established. In addition, proper adjustment of the upper and lower limits $S_{max}$ and $S_{min}$ enables the present invention to incur fewer call losses and to maintain substantially equal wait time for line connection demands compared with conventional fixed allotment methods.

A further preferred embodiment of the present invention will be described in conjunction with FIGS. 6 and 8. Since the present embodiment employs substantially the same system configuration as the former embodiments described in association with FIGS. 9 through 14, description of the system structure is omitted for brevity's sake.

The present embodiment includes a plurality of branch stations 3-1, 3-2, . . . 3-n of different sizes and capacities incorporated into the system illustrated in FIGS. 9 through 14.

FIG. 6 is a flowchart illustrating the allocation and release of time slots for branch stations 3-1, 3-2, . . . 3-n. FIG. 7 is also a flowchart showing the supplement and return of reserved time slots between the control station and a branch station, as viewed from the standpoint of a branch station.

The control station 1 performs the operations of the flowcharts shown in FIGS. 6 through 8 in which it controls separately two types of time slots, the first group $S_o$ employed to establish interstation line connection in response to a demand from the control station's terminals and the second group or reserve of supplementary time slots $S_{svs}$ for supplement in response to a demand for slot supplement from branch stations 3-1, 3-2, . . . 3-n. Each of the branch stations performs the operations of the flowcharts shown in FIGS. 6 and 7 in which they control their respective reserve of time slots $S_1$ employed for interstation line connection.

Figure 6A:
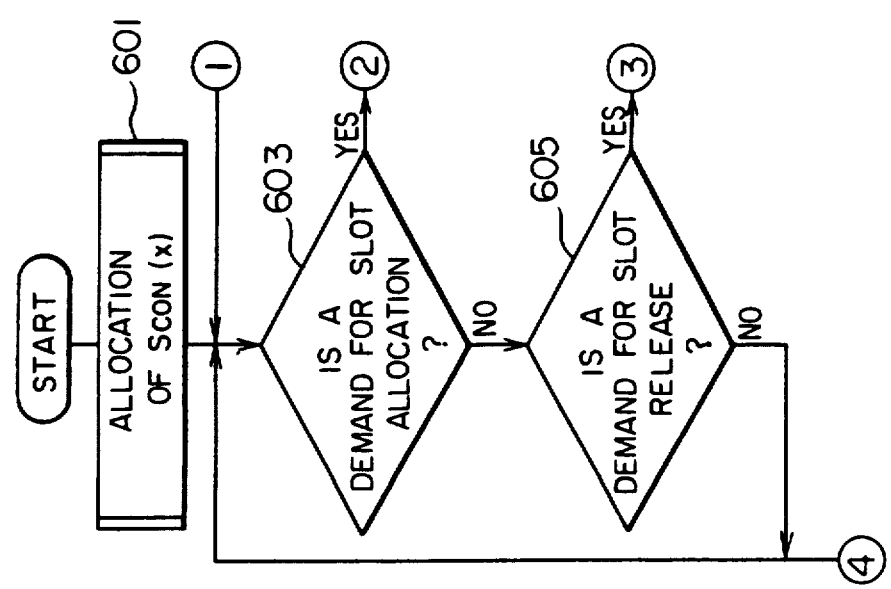
FIG. 6(a) is a flowchart showing how time slots are allocated or released by the branch station and the terminal device according to a second embodiment of the invention.

In the slot allocation/release operation, as shown in FIG. 6(a), the control station 1 allocates a different required number of reserve time slots $S_{con}(x)$ to each of the stations including the control station 1. This initial $S_{con}(x)$ slot allocation operation is done at the time of system initialization (Step 601). "X" in $S_{con}(x)$ represents the demanded number of time slots and is written as control data in the control area of a frame shown in FIG. 10.

The branch station 3-1, 3-2, . . . 3-n performs the time slot allocation operation (Step 603 in FIG. 6(a)) in response to a demand for slot allocation from one of their respective terminals. Also, when a terminal makes a demand to release the previously allocated slots (Step 605), the associated branch station performs the slot release operation shown in FIG. 6(c).

In more detail, when a branch station 3-1, 3-2, . . . 3-n receives a demand for time slot allocation from an associated terminal, it allocates free time slots $S_{free}$ from its own reserve (Steps 607, 609) providing there are sufficient time slots left. As a result, the branch station may have its reserve of free time slots $S_{free}$ decrease to the lower limit $S_{min}$ (Step 611). If this happens, the branch station demands that the control station 1 supply a plurality of time slots $S_{dem}(x)$ from its reserve of supplementary slots. Step 613 is the control station's $S_{dem}(x)$ supplement operation to achieve this demand. "X" in $S_{dem}(x)$ represents the demanded number of time slots and is written as control information in the control area of a frame such as the frame shown in FIG. 15.

If the reserve of supplementary time slots at the control station 1 is not sufficient to replenish the demanded number of time slots $S_{dem}(x)$ from a branch station 3-1, 3-2, . . . 3-n, the control station 1 cannot perform the $S_{dem}(x)$ slot supplement operation.

Besides, if the branch station receives a further demand for time slot allocation from other terminals of the branch station, its reserve of free slots $S_{free}$ may fall below the lower limit $S_{min}$ or be reduced to null. In this particular embodiment, a demand for time slot allocation when the branch station has no free time slots $S_{free}$ left, is processed as a call loss (Step 615).

When a branch station 3-1, 3-2, . . . 3-n receives a demand from an associated terminal to release the previously allocated time slots $S_{busy}$, the branch station performs the $S_{busy}$ release operation (Step 617). As a consequence, the branch station may have its reserve of free time slots $S_{free}$ to increase to the upper limit $S_{max}$ (Step 621). If this happens, the branch station performs the $S_{ret}(x)$ return operation (Step 623) to return the excess slots $S_{ret}(x)$ from its reserve to the control station 1.

However, if the reserve of free time slots S at a branch station, obtained by adding the just returned slots $S_{busy}$ to the previous free slots $S_{free}$, is below the originally allocated time slots $S_{con}(x,)$ (Step 619), the branch station does not perform the $S_{dem}(x)$ return operation.

In the time slot supplement and return operations, as viewed from the standpoint of a branch station, when a demand for the original allocation of slots $S_{con}(x)$ (Step 709) is made (Step 702) to the control station 1 from any of the stations, whether control or branch, the $S_{con}(x)$ allocation operation is performed by the control station, as shown in FIG. 7(a). Thus, the original allocation of time slots $S_{con}(x)$ is completed.

When the reserve of free time slots $S_{free}$ at the control station or at any of the branch stations (Step 711), has reached the lower limit $S_{min}$, the $S_{dem}(x)$ supplement operation is performed. In the $S_{dem}(x)$ supplement operation shown in FIG. 7(b), when a station, whether control or branch, has its reserve of free time slots $S_{free}$ to reach the lower limit $S_{min}$, a demand to supplement a required number of time slots $S_{dem}(x)$ is made to the control station 1 (Step 705). When the control station receives such a demand (Step 705), it completes the $S_{dem}(x)$ supplement operation. However, if the reserve of supplementary time slots at the control station 1 is below the required number of slots $S_{dem}(x)$, the control, station 1 transmits a signal indicating rejection of the supplement demand and completes the process without slot supplement.

The $S_{dem}(x)$ supplement operation is activated by a demand for time slot supplement issued when the reserve of free time slots $S_{free}$ at a station, whether control or branch, falls to the lower limit $S_{min}$. However, all the rest of the steps including the actual supplement were processed as an asynchronous background operation, independently of line connection.

Furthermore, when a branch station has its reserve of free time slots $S_{free}$ reach the upper limit $S_{max}$ (Step 713), the branch performs the $S_{ret}(x)$ return operation to return the excess slots $S_{ret}(x)$ to the control station. In the $S_{ret}(x)$ operation shown in FIG. 7(c), when the reserve of free time slots $S_{free}$ at any of the stations including ther control station 1, has reached the upper limit $S_{max}$, the excess time slots $S_{ret}(x)$ is returned to the control section (Step 707).

This $S_{ret}(x)$ return operation is activated by a demand for slot return issued when a branch station 3-1, 3-2, . . . 3-n has its reserve of free slots $S_{free}$ reach the upper limit $S_{max}$. At this time all the rest of the operations including the actual slot return is completed as an asynchronous background operation, independent of the line connection.

To control this reserve of supplementary time slots $S_{svs}$, the control station 1 performs the initial slot allocation and reserve slot supplement/return operations, as shown in FIG. 8, to supply each station with the initial reserve of slots and supply or recover supplementary slots for each branch station.

At the time of system startup, the control station 1, in response to a demand for initial time slot allocation from a station, whether control or branch (Step 801), allocates an initial reserve of time slots $S_{con}(x)$ to the station (Step 817). However, if the reserve of supplementary time slots $S_{svs}$ at the control station 1 is below the demanded number of initial allocation $S_{con}(x)$ (Step 815), the control station transmits an $S_{con}(x)$ supplement rejection signal to the station that made the demand, without making any initial time slot allocation (Step 819).

Furthermore, when a demand to supplement reserve time slots from any of the branch stations 3-1, 3-2, . . . 3-n (Step 803), the control station supplies the branch station with a plurality of supplementary time slots $S_{dem}(x)$ (Step 807). "X" of $S_{dem}(x)$ represents the number of demanded time slots and is written as control information in the control area of a frame illustrated in FIG. 10. However, if the reserve of supplementary time slots at the control station 1 is below the demanded number of supplementary slots $S_{dem}(x)$ (Step 805), the control station 1 transmits an $S_{dem}(x)$ supplement rejection signal to the branch station that made the demand, without making any slot supplement.

In addition, when a branch station 3-1, 3-2 . . . 3-n returns excess time slots $S_{ret}(x)$ (Step 811), the control station 1 adds the returned slots $S_{ret}(x)$ to its reserve of supplementary time slots $S_{svs}$ into a now total reserve (Step 813).

With the above operations, the present embodiment not only improves upon the performance of the conventional methods of time slot allocation by central control and fixed allotment but also improves upon the performance of the former embodiments of this invention by providing such a lower call loss rate and a shorter lapsed time before line connection is established. In addition, proper adjustment of the upper and lower limits $S_{max}$ and $S_{min}$ enables the present invention to incur fewer call losses and to maintain substantially equal wait times for line connection demands compared with conventional fixed allotment methods.

It is to be noted that the present invention is not limited to the above preferred embodiments and figures, which are given only by way of illustration, and can be contemplated in modifications and variations without departing from the spirit of the invention. For example, determination of the number of time slots allocated to branch stations may be based on an estimation of communication calls or information on system control. Also, where change in the frequency of communications calls is predictable over a period, the number of allocated slots may be varied for different stations.

In addition, the present invention can be applied to loop network systems using other transmission medium than the optical fiber of the embodiments, such as a coaxial cable.

What is claimed is:

1. A method of time slot allocation for a loop network that is configured by loop-connecting a control station and a plurality of branch stations, and wherein interstation communication is made by transmitting a fixed-length frame through a transmission path, the frame including a synchronization area, a control area, and a data area composed of a plurality of time slots, the method comprising the steps of:

allocating, by the control station, a first predetermined number of time slots of the data area to the control station and to each of the branch stations for communication;

reserving, in the control station, a second predetermined number of time slots of the data area;

setting, in each branch station, an upper limit and a lower limit of a number of the time slots possessed by the branch station;

communicating, by each branch station, with the control station or with other branch stations using the time slots allocated to each branch station;

transmitting, by each branch station, to the control station a demand for supplemental time slots when a number of unused time slots of the branch station is below the lower limit, the demand carried in the control area of the frame;

supplying, by the control station, the demanding branch station with time slots from the time slots reserved in the control station, the supplying step performed after the demand transmitting step; and returning, by each branch station, unused time slots to the control station when a number of the unused time slots of the branch station exceeds the upper limit.

2. A loop network system that is configured by loop-connecting a control station and a plurality of branch stations, and wherein interstation communication is made by transmitting a fixed-length frame through a transmission path, the frame including a synchronization area, a control area, and a data area composed of a plurality of time slots, the control station comprising:

means for allocating a first predetermined number of the time slots of the data area to the control station and to each of the branch stations for communication;

means for reserving a second predetermined number of time slots of the data area for reservation; and means for supplying a branch station with time slots from the time slots reserved by the control station after receiving a demand for supplemental time slots from the branch station;

the branch station comprising:

means for setting an upper limit and a lower limit of a number of the time slots possessed by the branch station;

means for communicating with the control station or with another branch station using the time slots allocated to the branch station;

means for transmitting to the control station a demand for supplemental time slots when a number of unused time slots of the branch station is below the lower limit; and means for returning the unused time slots to the control station when a number of unused time slots of the branch station exceeds the upper limit.

3. A control station in a loop network system that is configured by loop-connecting the control station and a plurality of branch stations, and wherein interstation communication is made by transmitting a fixed-length frame through a transmission path, the frame including a synchronization area, a control area, and a data area composed of a plurality of time slots, the control station comprising:

means for allocating a first predetermined number of the time slots of the data area to the control station and to each of the branch stations for communication;

means for reserving a second predetermined number of time slots of the data area for reservation;

means for receiving a demand for supplemental time slots from a branch station, the demand carried in the control area of a frame; and means for supplying the branch station with time slots from the time slots reserved by the control station in response to receiving the demand for supplemental time slots from the branch station.

4. A branch station in a loop network system that is configured by loop-connecting a control station and a plurality of branch stations including a first branch station, wherein interstation communication is made by transmitting a fixed-length frame through a transmission path, the frame including a synchronization area, a control area, and a data area composed of a plurality of time slots, the first branch station comprising:

means for setting an upper limit and a lower limit of a number of time slots possessed by the first branch station;

means for communicating with the control station or with another branch station using the time slots allocated to the first branch station;

means for transmitting to the control station a demand for supplemental time slots when a number of unused time slots of the first branch station is below the lower limit; and means for returning the unused time slots to the control station when a number of unused time slots of the branch station exceeds the upper limit.

* * * * *